(12) United States Patent
Liu et al.

(10) Patent No.: US 7,601,316 B2
(45) Date of Patent: Oct. 13, 2009

(54) METHOD OF REDUCING NOX AND PARTICULATES FROM INTERNAL COMBUSTION ENGINES

(75) Inventors: Ke Liu, East Longmeadow, MA (US); Wayne G. Wnuck, South Windsor, CT (US); John G. Buglass, Glastonbury, CT (US)

(73) Assignee: Shell Oil Company, Houston, TX (US)

( * ) Notice: Subject to any disclaimer, the term of this patent is extended or adjusted under 35 U.S.C. 154(b) by 67 days.

(21) Appl. No.: 10/658,494

(22) Filed: Sep. 8, 2003

(65) Prior Publication Data

US 2005/0053534 A1 Mar. 10, 2005

(51) Int. Cl.
*B01D 53/86* (2006.01)
(52) U.S. Cl. .................. 423/239.1; 423/245.1
(58) Field of Classification Search .......... 423/235, 423/239.1, 239.2, 245.1, DIG. 13
See application file for complete search history.

(56) References Cited

U.S. PATENT DOCUMENTS

| 4,585,632 A | 4/1986 | Schneider et al. ........... 423/239 |
| 5,041,272 A | 8/1991 | Tamura et al. .............. 423/239 |
| 5,164,350 A | 11/1992 | Abe et al. .................... 502/66 |
| 5,272,871 A | 12/1993 | Oshima et al. ................ 60/274 |
| 5,294,409 A * | 3/1994 | Cohen et al. ................ 422/169 |
| 5,412,946 A | 5/1995 | Oshima et al. ................ 60/286 |
| 5,591,417 A * | 1/1997 | Buchanan et al. ........... 423/210 |
| 6,708,486 B2 | 3/2004 | Hirota et al. |
| 6,775,973 B2 | 8/2004 | Liu et al. ....................... 60/301 |
| 6,895,746 B2 | 5/2005 | Buglass et al. ................ 60/286 |
| 2001/0041153 A1 | 11/2001 | Benz ........................... 422/169 |
| 2002/0054843 A1* | 5/2002 | Maunula .................. 423/213.5 |
| 2003/0140622 A1 | 7/2003 | Taylor, III et al. ............. 60/295 |

FOREIGN PATENT DOCUMENTS

| EP | 1055806 | 11/2000 |
| WO | WO0114698 | 3/2001 |
| WO | WO0134950 | 5/2001 |
| WO | WO03/004134 | 1/2003 |

OTHER PUBLICATIONS

U.S. Appl. No. 10/243,105, filed Sep. 13, 2002, Ke Liu.

* cited by examiner

*Primary Examiner*—Edward M Johnson

(57) ABSTRACT

Oxides of nitrogen are adsorbed onto the surfaces of, and particulates are trapped in, pores of channels (130, 133, 139-151) in a porous, interdigitated ceramic particulate filter (57, 100) that has relative rotation with respect to a gas inlet distributor (76, 101). The distributor has a baffle (85) or ribs (121, 122) that causes constantly flowing engine exhaust (53) to enter the filter channels over a large portion of a revolution of the adsorption bed or the distributor, and causes constantly flowing syngas (54) to thereafter pass through those passages during a small portion of each revolution. Either the inlet gas distributor (101) or the filter bed (57) may be rotated to distribute the gases. Dual, alternately regenerated filters (35, 36) may be used.

4 Claims, 5 Drawing Sheets

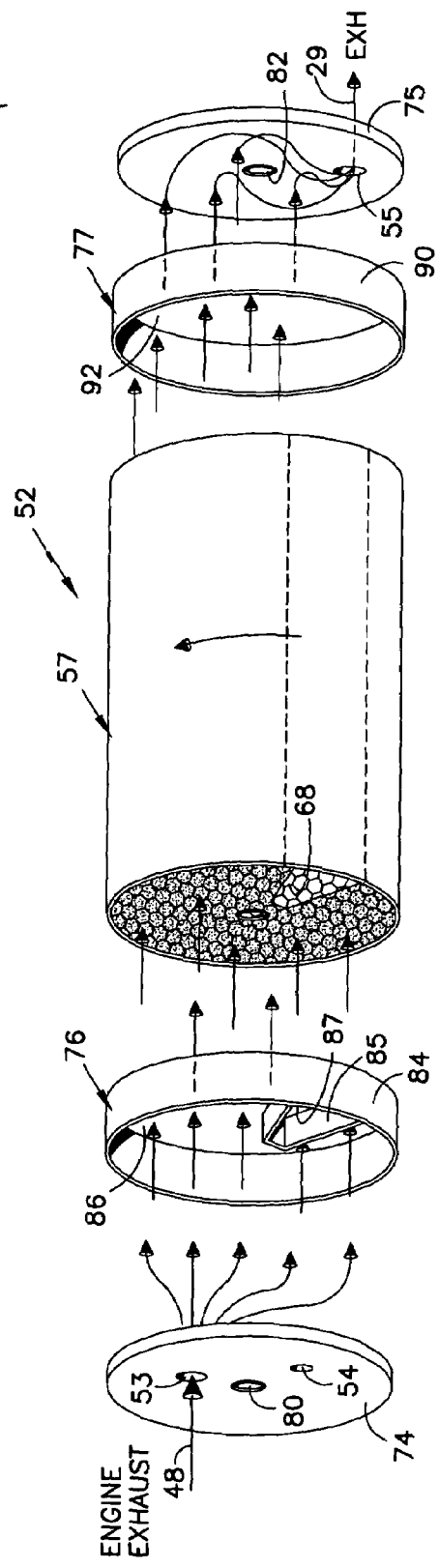
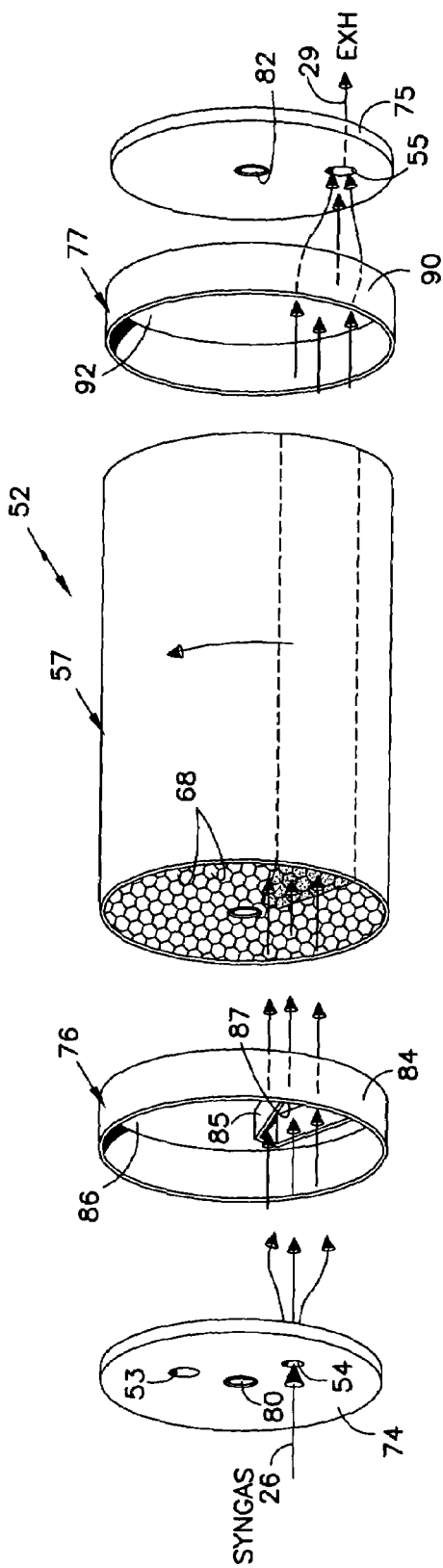
FIG.2
FIG.3

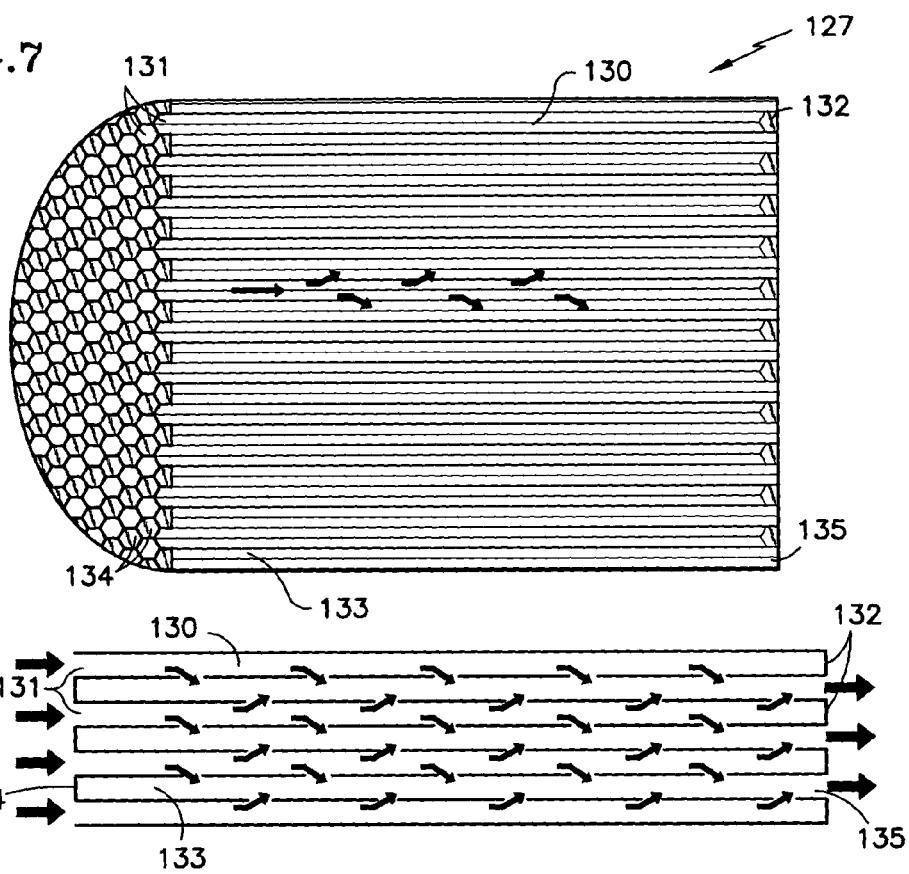
FIG. 7
FIG. 7a
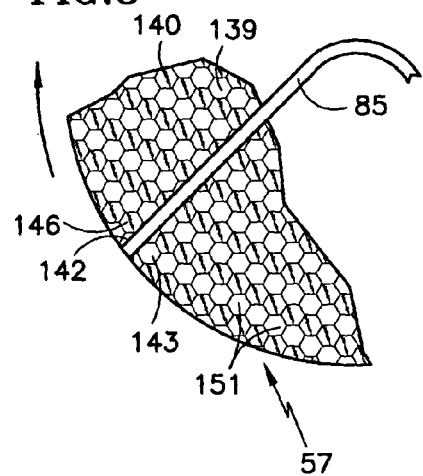
FIG. 8
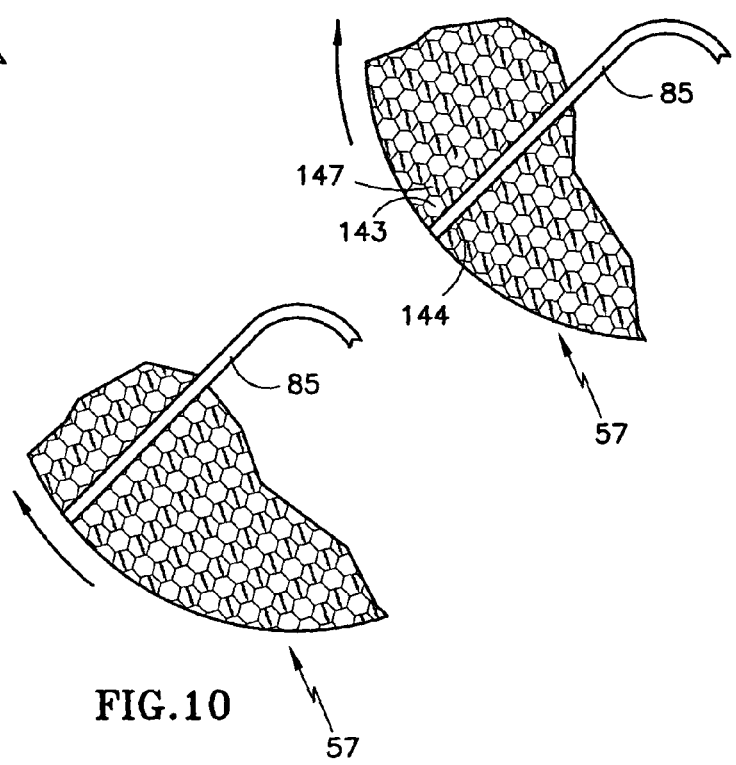
FIG. 9
FIG. 10

METHOD OF REDUCING NOX AND PARTICULATES FROM INTERNAL COMBUSTION ENGINES

TECHNICAL FIELD

This invention relates to reducing oxides of nitrogen (NOx) and particulate matter (PM) from exhaust of hydrocarbon-fueled internal combustion engines in a single stage apparatus, including desulfurization of NOx in some embodiments.

BACKGROUND ART

The Environmental Protection Agency (EPA) has set diesel engine emission requirements including NOx and non-methane hydrocarbons below 0.20 grams bhp-hr and 0.14 grams/bhp-hr, respectively. This contrasts with current standards of 4.0 grams/bhp-hr and 1.3 grams/bhp-hr, respectively. Thus, the diesel engine emission control systems must accomplish a significant reduction in NOx and PM.

Apparatus that oxidizes engine fuel to provide a mix that enhances NOx reduction is disclosed in U.S. Pat. No. 5,412,946, in PCT published application WO 01/34950, and U.S. patent application Publication 2001/41153.

In commonly owned U.S. patent application Ser. No. 10/159,369, filed May 31, 2002, moisture and possibly oxygen, derived from the exhaust of a hydrocarbon-fueled, internal combustion engine are processed along with fuel from the engine's fuel tank in a fuel processor, which may be a catalytic partial oxidation reformer, a homogeneous non-catalytic partial oxidation reformer, or an auto thermal reformer, to generate a stream including hydrogen and carbon monoxide (syngas) which is used to regenerate NOx traps following the formation of nitrogen-containing compounds by reaction of the exhaust with adsorbent in the NOx traps.

In FIG. 1, an engine 9 has a conventional turbo compressor 10 feeding an air inlet line 11, a hydrocarbon fuel tank 12, and a fuel pump 13. The fuel may be diesel fuel, gasoline, natural gas, liquid petroleum gas, or propane. The fuel is fed by a first line 17 to the engine for combustion with the air, and is fed by a second line 18 through a heat exchanger 50, to a mixer 19 in a pipe 20 that feeds a small amount of exhaust from an exhaust pipe 21 to a syngas generator 22. The heat exchanger 50 causes heat of the engine exhaust to preheat or vaporize the fuel in the line 18 before applying it to the syngas generator.

The syngas generator 22 may be a catalytic partial oxidizer (CPO), a homogeneous non-catalytic partial oxidizer (POX), or an auto thermal reformer (ATR). Within a CPO, foam monolith or other form of catalyst, which may comprise a group VII metal, preferably nickel, cobalt, rhodium, iridium, palladium or platinum, converts fuel along with water and oxygen into a mix of hydrogen, CO and $CO_2$, which is commonly called "syngas". This is provided through a conduit 26 to a continuously operable regenerating NOx adsorption bed apparatus 52, in which the filter itself may rotate with a stationary inlet manifold, or the inlet manifold may rotate with a stationary filter, as described more fully in U.S. patent application Ser. No. 10/309,712, filed Dec. 4, 2002 and in FIGS. 2-6 herein.

Although various adsorbents may be used, the NOx traps may, for example, contain barium carbonate ($BaCO_3$) as the adsorbent. Typically, a catalyst, such as platinum, may be dispersed on the adsorbent material to catalyze the NOx reduction reaction. When the diesel exhaust is adsorbed by the barium carbonate, a reaction, catalyzed by platinum, generates barium nitrate.

$$2NOx + BaCO_3 \rightarrow Ba(NO_3)_2 + CO_2$$

Then, during the regeneration cycle, the barium nitrate is converted catalytically in the presence of a noble metal catalyst, such as platinum, back to barium carbonate, as follows:

$$3H_2 + 2CO + Ba(NO_3)_2 \rightarrow BaCO_3 + N_2 + 3H_2O + CO_2$$

A CPO reformer is preferred in one sense because it is very small and can run with low steam carbon ratios and high turndown ratios without soot or carbon formation. However, diesel engine exhaust contains particulates (soot) and oxides of sulfur (SOx), which may deactivate the CPO catalyst over a period of time. Therefore, a homogeneous non-catalytic partial oxidizer (POX) may alternatively be selected as the syngas generator 22. The percentage of hydrogen produced is only slightly less than that produced by a CPO. It is easily started by employing a simple spark plug, as is known. Additionally, POX is cheaper than CPO; control of the $O_2/C$ ratio is known (similar to engine $O_2$/fuel ratio), and simpler; SOx and soot do not affect it; and the challenges of steam/C and $O_2/C$ ratio control problems are much easier to handle compared with that of a CPO.

Because the alternating absorption and regeneration cycles have difficulty with high temperature valves, which allow on the order of 5% of total engine exhaust to leak through the wrong absorption bed during regeneration, thereby wasting a significant amount of syngas by combusting with the oxygen in the exhaust, the invention in the parent application provided a relatively rotating inlet gas distributor and NOx adsorption bed having a plurality of flow paths lined with adsorption catalyst. The exhaust flows in a given path during a first fraction of a revolution, during which time the NOx is adsorbed therein, and syngas flows into each path during the remainder of each revolution. Both exhaust gas and syngas are flowed continuously through the NOx adsorption bed.

Using the improved NOx adsorption bed of the parent application still requires that there be a particulate filter to reduce particulate emissions, and some accommodation to handle sulfur, which is adsorbed onto the NOx adsorbent and reduces its effectiveness. The processes are:

SOx trap: $BaCO_3 + SOx \rightarrow BaSO_4 + CO_2$

SOx regen (at high temp): $BaSO_4 \rightarrow BaO + SOx$ or

SOx regen (at high temp): $BaSO_4 + CO_2$ $BaCO_3 + SOx$

In a particulate filter, extra fuel or syngas must be burned to raise the temperature of the particulate filter in order to initiate the particulate oxidation process once in a while (when enough particulates accumulate on the filter). Extra controls are required for periodical regeneration of the particulate filter. As a result of diesel engine exhaust, the NOx adsorber catalysts, which contain platinum over barium oxides, could be deactivated due to sulfur, phosphate, zinc or other components in the diesel fuel or in the lubricants of the diesel engines. Thus, regenerating the NOx adsorber catalyst from the effects of those contaminants must be accommodated.

DISCLOSURE OF INVENTION

Objects of the invention include: removing oxides of nitrogen and particulates from internal combustion engine exhaust in a cost effective manner; removing oxides of nitrogen and sulfur from internal combustion engine exhaust with a minimum usage of syngas; effective and efficient removal of oxides of nitrogen, sulfur and particulates from internal combustion engine exhaust; apparatus for treating internal combustion engine exhaust for NOx, sulfur and particulates, which utilizes a minimum amount of space; improved treatment of internal combustion engine exhaust to remove NOx, particulates and sulfur.

This invention is predicated first on the discovery that the utilization of syngas for regeneration of NOx adsorber material can also accommodate the utilization of syngas for catalytic burning of particulates in a filter. The invention is further predicated on the discovery that use of a rotating interdigitated monolith will provide mixing of exhaust gas and syngas in outflow interdigitated channels which are precisely at the interface with the mutually rotating inlet gas distributor. The invention is predicated further on the discovery that highly concentrated syngas mixing with exhaust and undergoing catalytic combustion can produce a higher temperature at the point of mixing, sufficient to decompose $BaSO_4$ into $BaO$ and $SOx$, thereby regenerating the NOx adsorbent.

According to the present invention, an inlet gas distributor and an interdigitated monolith, wash coated with NOx adsorption material and a regeneration and combustion catalyst, such as platinum, are relatively rotated to cause a flow of exhaust into each inlet channel of the filter inlet during a first, large fraction of a revolution, and a flow of syngas into each inlet channel of the filter inlet during a small, remainder of each revolution.

Because the filter has interdigitated channels, the flow of exhaust gas, for instance, into an inlet channel will cause flow into adjacent outlet channels, and the flow of syngas into an inlet channel will cause flow into some of the same outlet channels simultaneously with the exhaust gas. Thus, the gases will mix in the outflow channels adjacent the gas interface, as the interface crosses successive channels.

According to the invention, an interdigitated porous ceramic filter having an NOx adsorber catalyst and a particulate combustion catalyst wash coated or otherwise disposed throughout the passageways and pores is utilized both for NOx reduction and particulate oxidation in the exhaust of hydrocarbon-fueled internal combustion engines.

The invention combines a total of five functions: particulate trap, particulate oxidation, NOx trap, NOx reduction and Nox-trap desulfurization, all into one rotational unit that contains an interdigitated monolith either wash coated (or extruded) with NOx trap material, such as $BaCO_3$ and precious metal catalyst, such as Pt, for catalyzing the NOx reduction and particulates oxidation reactions.

Although elements of the invention may be practiced with a dual, alternately regenerated, pair of combined NOx adsorption and particulate filtering structures, a rotary structure which provides limited mixing of exhaust gas and syngas is preferred.

Other objects, features and advantages of the present invention will become more apparent in the light of the following detailed description of exemplary embodiments thereof, as illustrated in the accompanying drawing.

BRIEF DESCRIPTION OF THE DRAWINGS

FIG. 2 is a simplified, schematized, exploded, perspective view of a continuous flow, rotating regeneratable adsorption filter apparatus according to the present invention, illustrating the flow path of the engine exhaust.

FIG. 3 is a simplified, schematized, exploded, perspective view of a continuous flow, rotating regeneratable adsorption filter apparatus according to the present invention, illustrating the flow path of the syngas.

FIG. 7 is a stylized, sectioned perspective view of an exemplary interdigitated particulate filter.

FIG. 7a is a schematic view of interdigitated flow channels.

FIGS. 8-10 are fractional, end elevation views of interdigitated honeycomb adsorption filters which may be used to implement the present invention, rotated in mutually different positions.

MODE(S) FOR CARRYING OUT THE INVENTION

Figure 1:
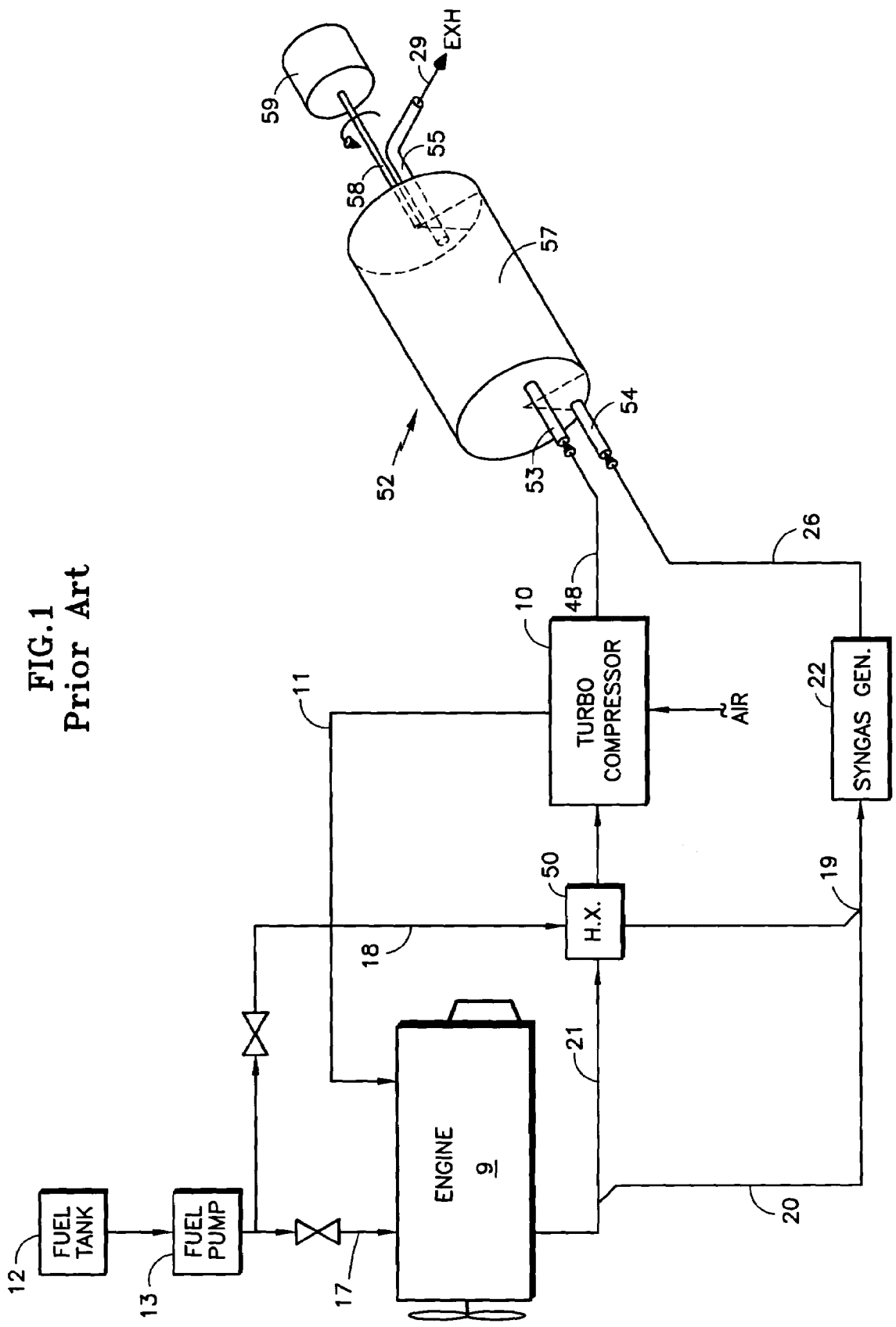
FIG. 1 is a simplified, stylized schematic illustration of an engine incorporating a prior art NOx trap having relative rotation between a gas inlet manifold and an NOx adsorption filter.

In FIG. 1, the filter apparatus 52 has an engine exhaust inlet port 53, which receives engine exhaust from a pipe 48, and a syngas inlet port 54 which receives syngas over the line 26. The apparatus 52 has an engine exhaust outlet port 55 connected to the exhaust line 29. Within the apparatus 52 is a filter and adsorption bed 57 of the invention that is illustrated in FIGS. 2-6. The filter assembly 52 may have a shaft 58 driven by a motor 59 for rotating the bed 57 or the gas inlet manifold, as is described more fully hereinafter. The bed or manifold may be rotated very slowly, such as between 0-1 RPM and 20 RPM.

Referring to FIG. 2, the filter apparatus 52 includes an inlet end cap 74, an outlet cap 75, a stationary inlet gas distributor 76 and an outlet manifold 77. The inlet cap 74 has holes comprising part of the exhaust and regeneration gas inlet ports 53, 54 (FIG. 1) and a bearing 80 to journal the shaft 58. The outlet cap 75 has a hole comprising part of the exhaust gas outlet port 55 (FIG. 1) and a bearing 82 for journaling the shaft 58. The inlet gas distributor 76 comprises a cylindrical outer wall 84, and a baffle 85 defining two chambers 86, 87 that determine the flow path of the two inlet gases.

The outlet manifold 77 has a cylindrical outer wall 90 defining a chamber 92. The engine exhaust and the spent syngas are both flowed to the same exhaust 29 through the exhaust port 55.

In FIG. 2, the flow path of the engine exhaust is illustrated as being through the exhaust inlet port 53, through the chamber 86 and thence through all of the inlet pathways in the darkened sector in FIG. 2, through the chamber 92, and thence through the exhaust outlet port 55 to the exhaust pipe 29.

In FIG. 3, the syngas flows through the regeneration gas inlet port 54, through the chamber 87 and all those inlet passageways which are darkened in FIG. 3, through the chamber 92, and through the exhaust gas outlet port 55 to the exhaust pipe 29.

The syngas may flow into gas paths 68 extending across about 10° (2.8%) in FIG. 3. In the general case however, the syngas may flow into between 2° (0.5%) and 180° (50%) of the gas paths at any one time.

It should be borne in mind that the engine exhaust and the syngas are both flowing simultaneously, all of the time. The flows are shown separately in FIGS. 2 and 3 simply to clarify the nature of the continuous operation.

Figure 4:
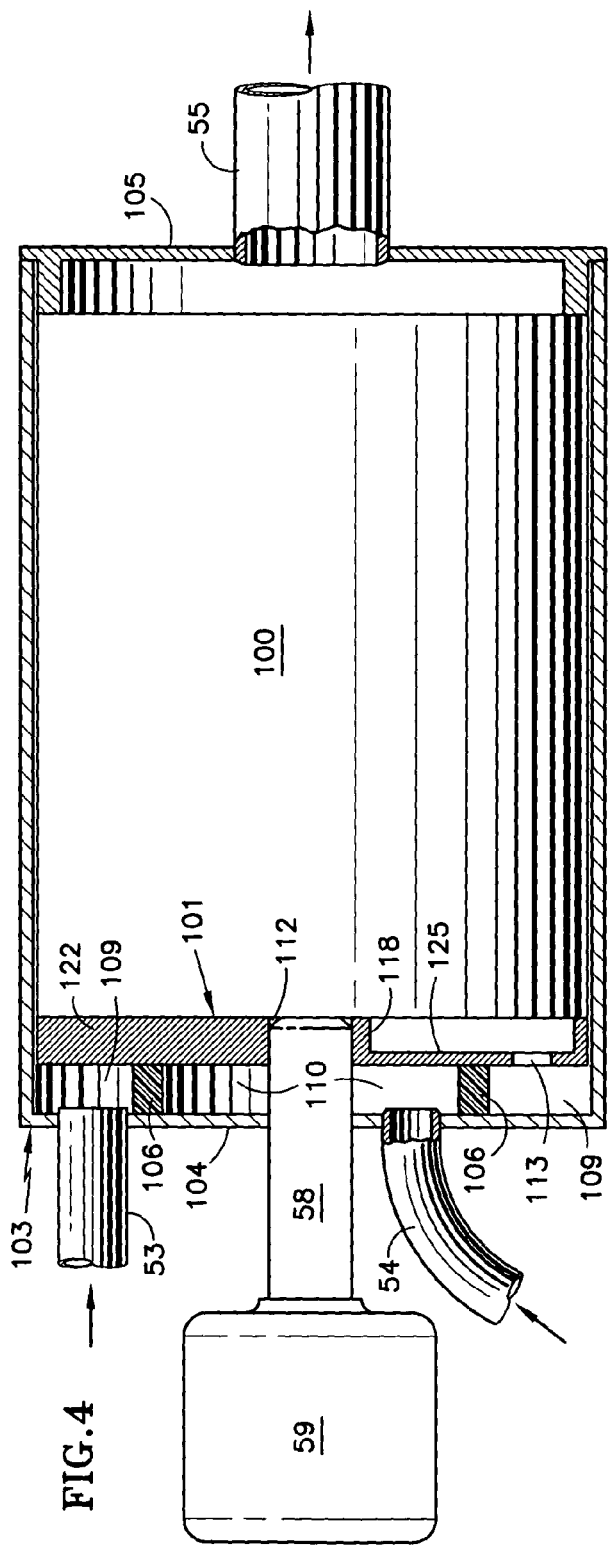
FIG. 4 is a simplified, stylized, partially sectioned side elevation schematic of an alternative embodiment of the present invention in which the inlet gas distributor rotates.
Figure 6:
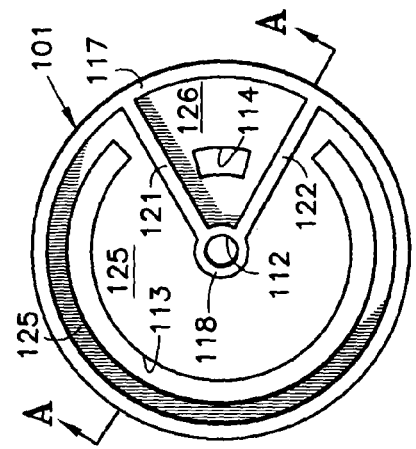
FIG. 6 is a bottom plan view of the rotating inlet gas distributor of FIG. 4; the view of the distributor in FIG. 4 is taken on the line A-A of FIG. 6.
Figure 5:
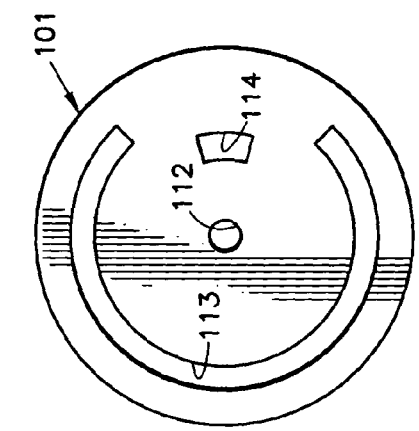
FIG. 5 is a top plan view of the rotating inlet gas distributor of FIG. 4.

Instead of utilizing a stationary inlet gas distributor 76 and a rotating adsorption filter 57, the invention may be practiced as illustrated in FIGS. 4-6 utilizing a stationary adsorption filter 100 and a rotating inlet gas distributor 101. The filter 100 and distributor 101 are within a cylindrical container 103 which is closed at the inlet end 104 thereof, and which has a cap 105 at the outlet end thereof to permit installation and retention of the filter 100. The cap 105 may be secured to the container 103 in any known fashion. A cylindrical divider and seal 106 divides the space between the end 104 and the distributor 101 into two annular channels 109, 110, which comprise portions of the respective gas inlets, with the respective gas inlet ports 53, 54. The exhaust gas entering through the exhaust gas inlet port 53 will flow throughout the channel 109, and the syngas entering through the syngas inlet port 54 will flow throughout the channel 110.

Referring to FIG. 5, the distributor 101 has a central hole 112 into which the motor shaft 58 is rigidly attached. A circular slot 113 allows gas to pass from the outer channel 109 into the stationary filter 100 during a very large fraction of a revolution of the distributor 101, such as on the order of between 180° and 358° of each revolution. A slot 114 allows syngas to flow into the stationary filter 100 during a small fraction of a revolution of the distributor 101, such as on the order of between 2° and 180°. In this embodiment, except for the holes 112-114, the inlet surface of the distributor 101, shown in FIG. 5, is flat.

The outlet side of the distributor 101, shown in FIGS. 4 and 5, includes a circumferential rib 117, a hub rib 118, and a pair of radial ribs 121, 122. The radial ribs 121, 122 separate the two gases, in the same fashion as does the baffle 85, in the embodiment of FIGS. 2 and 3. Exhaust gas entering the channel 109 will pass through the slot 113 into a chamber 125 (FIG. 6) which extends within the greater portion of the circumferential rib 117 on the side of the radial ribs 121, 122 on which the slot 113 is formed.

Similarly, the surfaces of the radial ribs 121, 122, which are adjacent the slot 114, will form, with the circumferential rib 117, a chamber 126 into which syngas will flow through the slot 114 from the annular channel 110 (FIG. 4).

As the distributor 101 rotates, the radial ribs 121, 122 divert one or the other of the gases into incrementally different portions of the stationary adsorption filter 100. The effect is the same in the embodiment of FIGS. 4-6 as it is in the embodiment of FIGS. 2 and 3.

The rotating filter 57 and stationary filter 100 are comprised of a conventional porous, interdigitated ceramic particulate filter monolith 127 (FIGS. 7-10), which however, in accordance with the invention, is wash-coated with an NOx adsorbent, such as barium carbonate and a catalyst, such as platinum, so that the filter will not only trap particulates mechanically, but will also adsorb oxides of nitrogen on the adsorbent surface and oxidize particulates with a platinum catalyst as well. Alternatively, the barium carbonate and platinum, or other adsorbent might be included in the slurry before extruding the monolith filter, and thus be within the material of which the filter is composed.

In FIGS. 7 and 7a, a stylized interdigitated filter 127 is illustrated as having inlet flow paths 130 (with white inlets at the left of FIG. 7) which are open at the inlet end 131 but blocked at the outlet end 132 thereof, and outlet flow paths 133 (shown dark at the left of FIG. 7) with their inlets 134 blocked, but their outlets 135 open. As illustrated by the arrows in FIGS. 7 and 7a, gas that enters one of the inlet channels 130 must flow through the porous monolith wall into one of the outlet channels 133 in order to exit. In the hexagonal example of FIG. 7, each of the inlet channels 130 is adjacent to four outlet channels 133, and each of the outlet channels 133 is adjacent to four inlet channels 130.

In FIG. 8, it is assumed that the filter 127 is rotating clockwise, in conjunction with a stationary inlet manifold baffle 85 (only a portion of which is shown in FIGS. 8-10). In FIGS. 8 and 9 the rows of channels are nearly perpendicular to the rib 122 which directs the flow of the two gases. In FIG. 8, exhaust gas is flowing into a channel 142 and syngas is entering a channel 143. A second or so later, as shown in FIG. 9, exhaust gas will be entering the channel 143 and syngas will be entering a channel 144. In FIG. 8, both syngas and exhaust gas will be flowing into a channel 146 from the channels 142 and 143. In FIG. 9, both syngas and exhaust gas will be flowing into a channel 147 from the channels 143 and 144. Thus, at the gas interface provided by the baffle 85, there will be a high concentration of exhaust/syngas mixture in outlet channels (such as channels 146, 147) which have just passed beyond the baffle 85. The oxygen in the exhaust (typically about 15% or so) will, in the presence of a platinum or other catalyst, combust syngas, raising the temperature in the area immediately ahead of the baffle 85 to on the order of 600° C. This temperature is high enough to not only combust particulate matter, which is primarily soot, but also to decompose $BaSO_4$ trapped in the monolith, in the same fashion as other particulates are trapped, into BaO and SOx, so that syngas is not only used to regenerate the NOx adsorbent, but is also used to oxidize particulate matter (PM) captured on the monolith walls.

In channels which are more than one or two channels removed from the baffle 85, as the interdigitated filter 57 continues to rotate, such as the channels 151 in FIG. 8, only syngas will be present in the inlet channels and flowing into the outlet channels, so that the temperature will be somewhat lower, such as between on the order of 350° and 500° C.; in this condition, only regeneration of the adsorption catalyst, such as barium carbonate, will take place. When desulfurization of the NOx trap adsorbent occurs continuously, the $BaSO_4$ never accumulates; this is one aspect of the present invention. Since $BaSO_4$ is continuously decomposed, it cannot deactivate the platinum/barium carbonate (or other) NOx adsorption material and catalysts.

However, if in any given embodiment, depending upon how a NOx adsorbing, regeneratable porous, interdigitated, particulate filter is implemented, should there be sulfur accumulation for some reason, all that need transpire in order to remove the sulfur is to occasionally inject a small amount of fuel into the exhaust just at the point where it enters the inlet manifold of the invention.

Although not shown in FIG. 1, the invention may be used with gas recirculation to the engine, which may take the form of exhaust gas recirculation (commonly called "EGR"), or syngas gas recirculation which could be effected by passing a fraction of the syngas in the conduit 26 to the air inlet line 11. The use of gas recirculation may provide improved overall NOx reduction, as is known and described in the prior art. However, the invention neither requires nor precludes the use of EGR.

Figure 11:
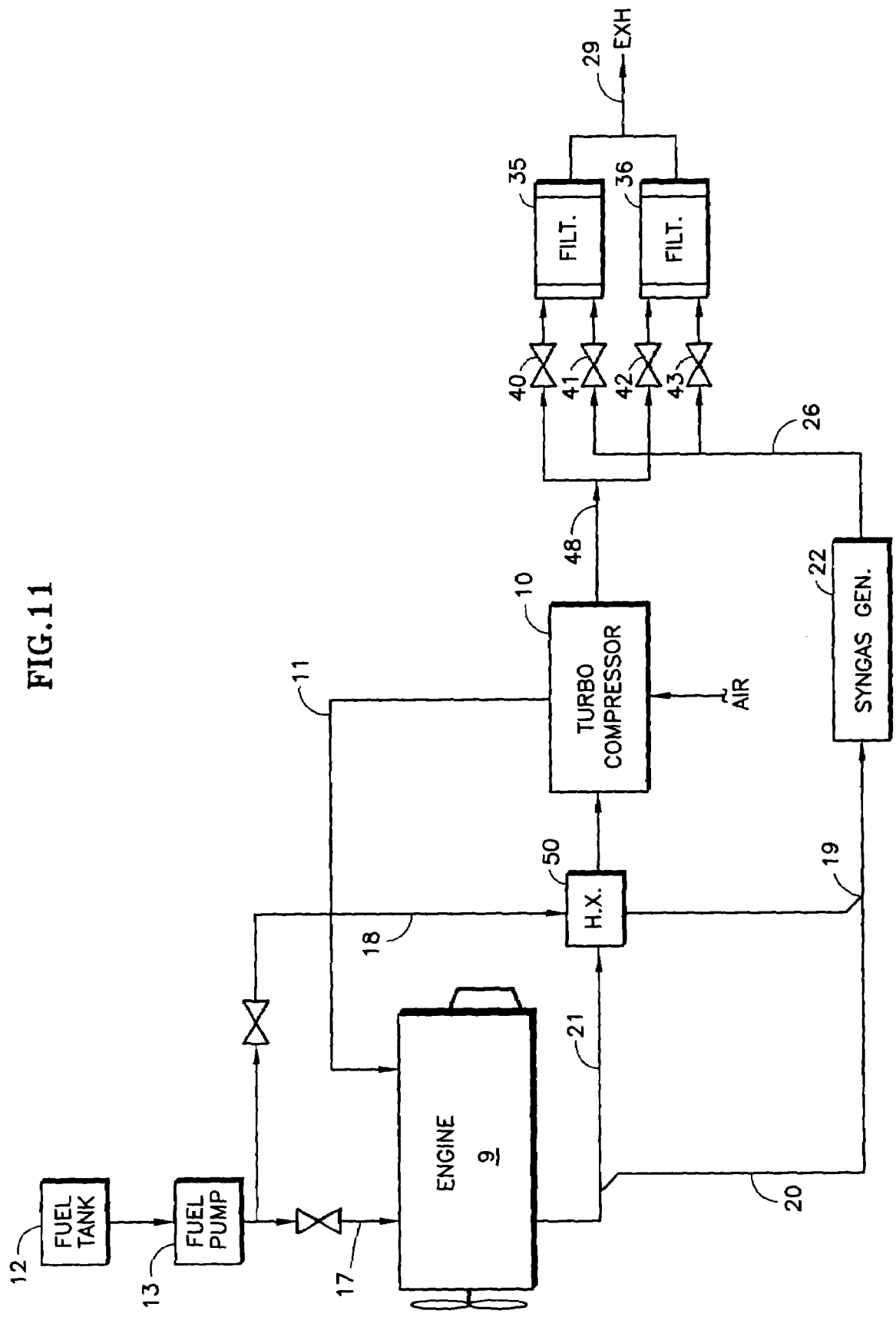
FIG. 11 is a simplified, stylized schematic illustration of an alternative form of combined NOx reduction and particulate removal.

Although the invention is preferably performed in the continuous process illustrated with respect to FIGS. 1-10, the combined NOx reduction and particulate removal may be achieved as in FIG. 11 using a pair of NOx adsorbent filters 35, 36 which are alternatively connected by corresponding valves 40-43 to either the conduit 26 containing syngas from the generator 22, or to the pipe 48 containing engine exhaust.

The valves are controlled so that engine exhaust is allowed to flow in one of the filters 35, 36 for a period of time which is less than the time necessary to saturate it with NOx, and then the valves are switched so that exhaust flows in the other NOx filter, while the first NOx filter is regenerated by the hydrogen and carbon monoxide from the syngas generator 22. In one regeneration cycle, the valves 41 and 42 will be closed and the valves 40, 43 will be open so that NOx in engine exhaust is adsorbed and particulates are trapped in the filter 35, and the trap 36 is regenerated; in the next regeneration cycle, valves 40 and 43 will be closed and the valves 41 and 42 will be open so that NOx is adsorbed and particulates are trapped in the filter 36, and the filter 35 is regenerated, and so forth.

If desired, the materials in the filter may be replenished by introducing, into the fuel supply of the engine, additives containing the NOx adsorbent material and/or the combustion catalyst. For instance, a platinum additive for diesel or gasoline fuel is commercially available.

The aforementioned patent and patent applications are incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A method of reducing both $NO_x$ and particulates in the exhaust of hydrocarbon-burning, internal combustion engines, comprising:

providing in the exhaust stream of an internal combustion engine at least one porous, interdigitated ceramic filter including a plurality of inlet channels and a plurality of outlet channels contiguous with said inlet channels, and having $NO_x$ adsorbent material and $NO_x$ reduction catalyst disposed on or in at least one of (a) on the surfaces of said channels or (b) within the pores of said filter or (c) within the material of which said filter is composed; and alternatively providing to each of said inlet channels syngas and said exhaust in an interleaved fashion, thereby to regenerate said $NO_x$ adsorbing material and to catalytically burn particulates trapped in said filter, wherein both syngas and said exhaust are simultaneously provided to said filter.

2. The method of claim 1, wherein the $NO_x$ adsorbent material comprises barium carbonate.

3. The method of claim 1, wherein the $NO_x$ reduction catalyst comprises platinum.

4. The method of claim 1, wherein syngas is provided to between 0.5% and 50% of said inlet channels.

* * * * *